C. H. BANTLEY.
ROTARY VALVE.
APPLICATION FILED NOV. 9, 1911.

1,094,295.

Patented Apr. 21, 1914.
2 SHEETS—SHEET 1.

WITNESSES

INVENTOR
Charles H. Bantley
BY
ATTORNEYS

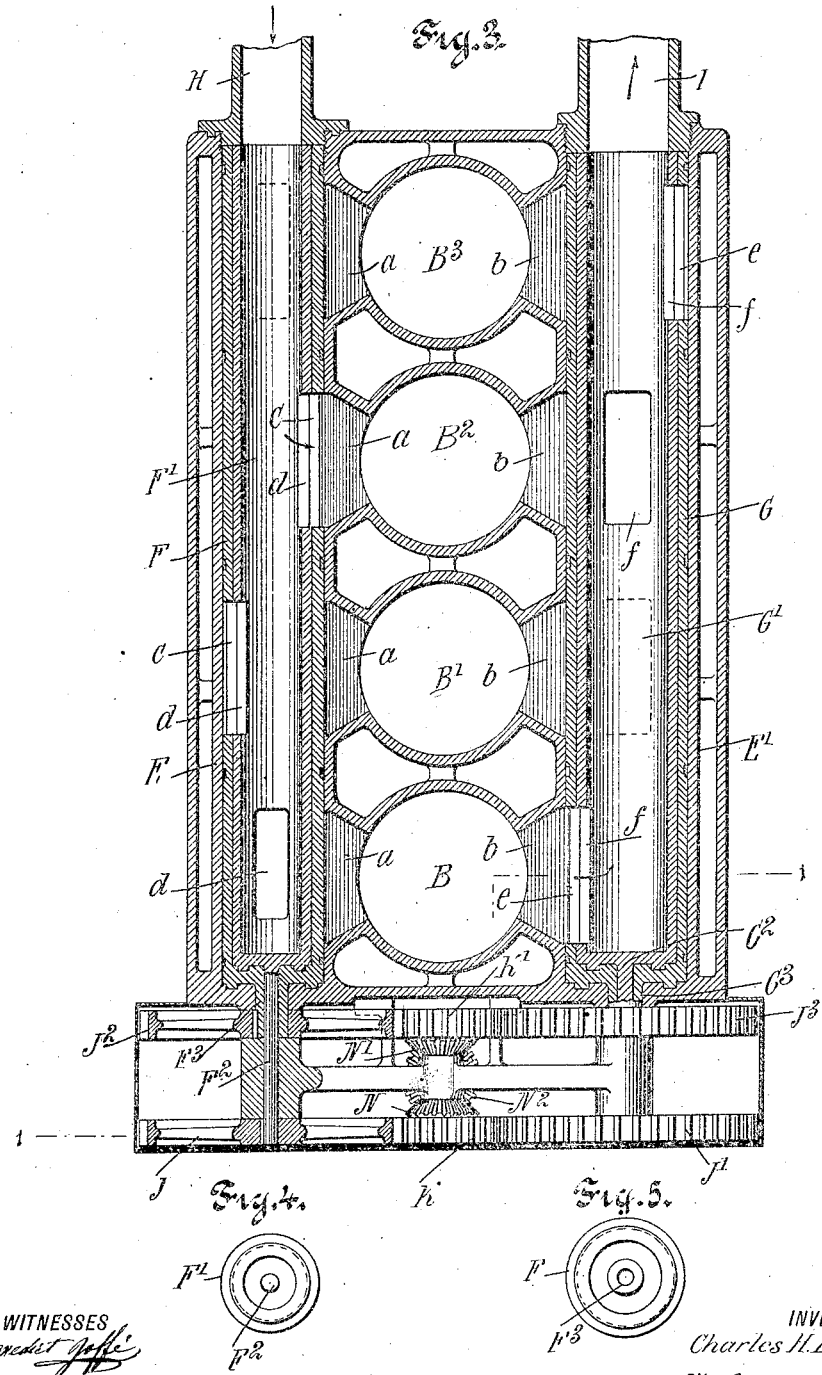

ED STATES PATENT OFFICE.

CHARLES H. BANTLEY, OF LEBANON, MISSOURI.

ROTARY VALVE.

1,094,295.

Specification of Letters Patent.  Patented Apr. 21, 1914.

Application filed November 9, 1911.  Serial No. 659,291.

*To all whom it may concern:*

Be it known that I, CHARLES H. BANTLEY, a citizen of the United States, and a resident of Lebanon, in the county of Laclede and State of Missouri, have invented a new and Improved Rotary Valve, of which the following is a full, clear, and exact description.

The object of the invention is to provide a new and improved rotary valve, more especially designed for internal combustion engines having one, two or more cylinders, and arranged to insure a proper admission of the explosive mixture to the cylinder or cylinders and a proper scouring and exhaust of the products of combustion from the cylinders, and to render the engine comparatively noiseless when running.

For the purpose mentioned, use is made of a rotary admission valve and a rotary exhaust valve, each valve consisting of two revoluble valve cylinders, one within the other and rotating in opposite directions, the valve cylinders having ports adapted to register with each other, and at the same time with a corresponding cylinder admission or exhaust port.

A practical embodiment of the invention is represented in the accompanying drawings forming a part of this specification, in which similar characters of reference indicate corresponding parts in all the views.

Figure 1:
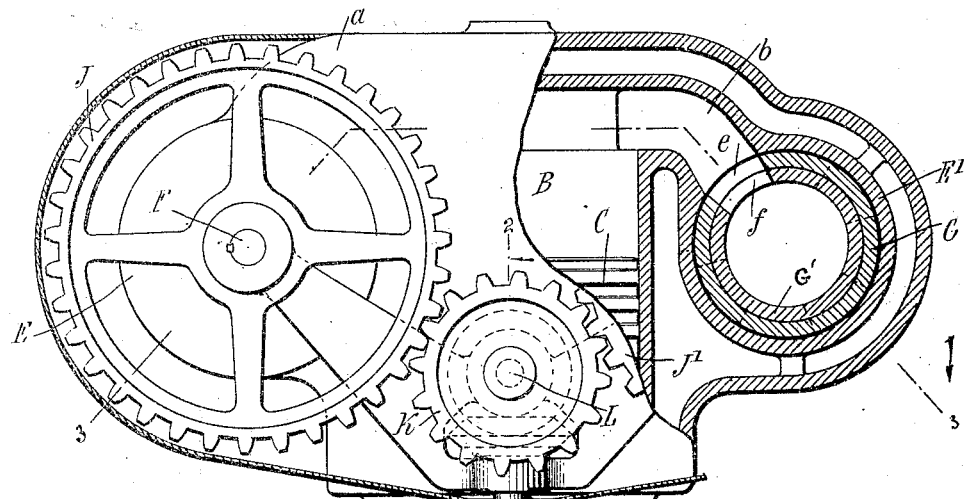
Figure 2:
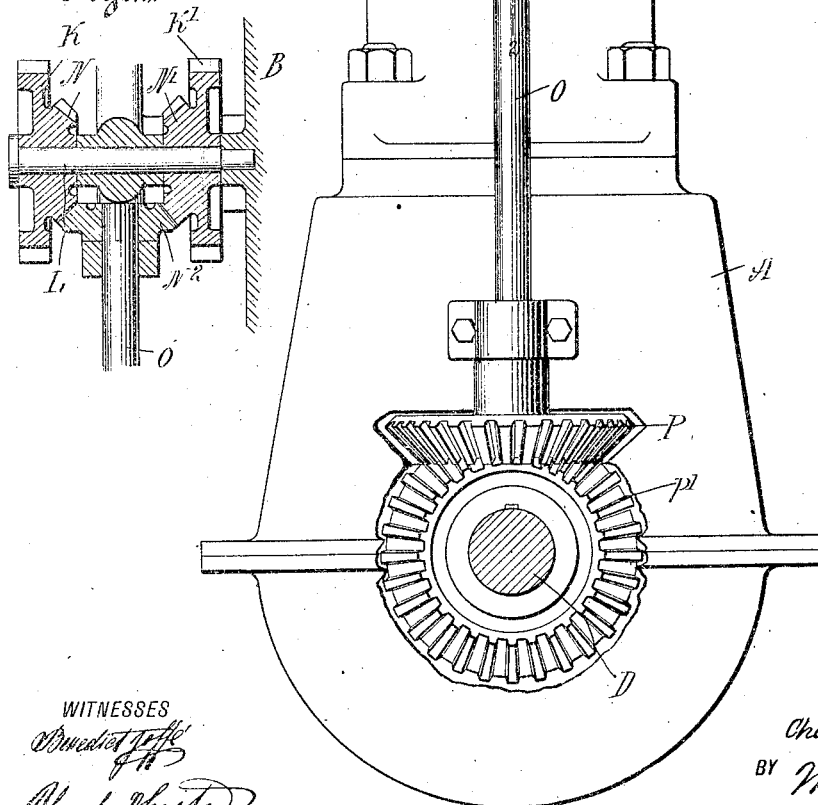

Figure 1 is a cross section of an internal combustion engine provided with rotary admission and exhaust valves, the section being on the line 1—1 of Fig. 3; Fig. 2 is a sectional side elevation of part of the gearing for rotating the admission and exhaust valves the section being on line 2—2 of Fig. 1; Fig. 3 is a sectional plan view of the internal combustion engine, the section being on the line 3—3 of Fig. 1; Fig. 4 is an end elevation of the inner valve cylinder of the admission valve; and Fig. 5 is a like view of the outer valve cylinder of the admission valve.

As shown in the drawings, the rotary valve is applied to an internal combustion engine both as an admission valve and an exhaust valve, the engine having four cylinders, but it is evident that the rotary admission and exhaust valves may be used on internal combustion engines having but one cylinder or a desired plurality of cylinders.

As shown in Fig. 1, the engine is mounted on an engine casing A, supporting the cylinders B, B', B², B³, each containing a piston C connected in the usual manner with the engine shaft D journaled in suitable bearings in the casing A. On opposite sides of the cylinders B, B', B² and B³ are arranged cylindrical admission and exhaust valve chests E and E', which may form integral parts of the cylinder or separate parts, bolted or otherwise fastened to the cylinders B, B', B² and B³. In the admission valve chest E is fitted to rotate an outer valve cylinder F within which is fitted an inner valve cylinder F', the said cylinders F and F' forming the admission valve, and being mounted to rotate in opposite directions as hereinafter more fully explained. Similar outer and inner valve cylinders G and G' constitute the exhaust valve, and the outer valve cylinder G is mounted to rotate in the exhaust valve chest E' while the inner valve cylinder G' is mounted to turn in the outer valve cylinder G, and one rotates in an opposite direction relative to the other.

Each of the cylinders B, B', B² and B³ is provided at its upper or working end and at opposite sides thereof with an admission port $a$ leading into the admission valve chest E, and an exhaust port $b$ leading to the exhaust valve chest E', and the ports $a$ of the several cylinders B, B', B² and B³ are adapted to register with ports $c$ formed in the outer valve cylinder F, and the said ports $c$ are adapted to register with ports $d$ formed in the inner valve cylinder F'. The exhaust ports $b$ of the several cylinders B, B', B² and B³ are adapted to register with ports $e$ formed in the outer valve cylinder G, and the ports $e$ are adapted to register with ports $f$ formed in the inner valve cylinder G'. It will be noticed that the several ports $c$ are staggered in a longitudinal direction, one relative to the other, and the ports $d$ are similarly arranged; the ports $e$ are likewise staggered in a longitudinal direction and similar to the ports $f$.

A supply pipe H is connected with one end of the inner valve cylinder F' to conduct the explosive mixture into the said inner valve cylinder F', and an exhaust pipe I connects with one end of the inner valve cylinder G' of the exhaust valve. The inner valve cylinders F' and G' are rotated in opposite directions relative to the outer valve cylinders F and G, and for this purpose the following arrangement is made: The end of the inner valve cylinder F' opposite the one connected with the supply pipe H is provided with a shaft $F^2$ which extends through a hollow shaft $F^3$ formed on the corresponding end of the outer valve cylinder F, and the inner valve cylinder G' is provided with a shaft $G^2$ extending through a hollow shaft $G^3$ on the corresponding end of the outer valve cylinder G. On the shafts $F^2$ and $G^2$ are secured gear wheels J and J', and similar gear wheels $J^2$, $J^3$ are secured on the hollow shafts $F^3$ and $G^3$, and the said gear wheels J and J' mesh with opposite sides of a gear wheel K mounted to rotate loosely on a stud L attached to the first cylinder B, and the gear wheels $J^2$ and $J^3$ are in mesh with opposite sides of a gear wheel K' likewise mounted to rotate loosely on the stud L.

On the gear wheels K and K' are secured or formed bevel gear wheels N, N' in mesh with a bevel gear wheel $N^2$ secured on the upper end of a shaft O provided at its lower end with a bevel gear wheel P in mesh with a bevel gear wheel P' secured on the engine shaft D. Now when the engine is running and the engine shaft D is turned then a rotary motion is transmitted by the gear wheels P' and P to the shaft O, which by the bevel gear wheel $N^2$ rotates both bevel gear wheels N and N' and consequently the gear wheels K and K', which by the gear wheels J and J' and $J^2$, $J^3$ rotate the outer and inner valve cylinders F and F' in opposite directions one relative to the other and likewise the outer and inner valve cylinders G and G', and the said outer and inner valve cylinders F, F' and G, G' are so arranged relatively one to the other that their ports c, d and e, f come in mesh with each other at the time they register with the corresponding admission or exhaust ports a or b of the corresponding cylinder B, B', $B^2$ or $B^3$.

It will be noted particularly from Fig. 3, that the closed ends of the valve cylinders F, F' and G, G' and the contiguous ends of the valve chests E and E' are provided with relatively engaging circular ribs and recesses whereby to form fluid-tight joints, and it is to be further noted that the pipes H and I abut the open ends of the several valve cylinders in order to hold the ribs and recesses in proper position irrespective of any other parts.

The operation in the different cylinders is alike, so it suffices to describe the operation of but one. When the piston C is at the down or suction stroke then the ports c and d of the outer and inner valve cylinders F and F' are in register with the ports a so that the explosive mixture passing from the supply pipe H into the inner valve cylinder F' passes through the said registering ports c, d, a into the upper end of the cylinder, B, and the said ports c, d move out of register with each other and also out of register with the port a previous to the time the piston C reaches the lower end of its downward or suction stroke. During the next upward or compression stroke the ports c, d are out of register with the port a, and when the piston C nears the upper end of its compression stroke an ignition takes place so that the piston C is now sent on its down or power stroke, and when the piston C next returns, the ports e and f move in register with each other and also in register with the port b so that the piston C during its return stroke forces the products of combustion out of the cylinder B through the said ports b, e, f into the inner valve cylinder G' from which the products of combustion can escape by way of the exhaust pipe I. It is understood that during the compression and power strokes both pairs of cylinder ports c, d and e, f are out of register with the ports a and b, and the ports e and f are also out of register with the port b during the suction stroke of the piston C, and the ports c and d are out of register with the port a during the exhaust stroke of the piston C.

It is understood that the several cylinders B, B', $B^2$ and $B^3$ receive the explosive mixture in proper succession, and the products of combustion are exhausted as above explained, and the admission valve serves to supply the explosive mixture to all the cylinders of the engine, and likewise the exhaust valve takes proper care of the products of combustion from all the different cylinders.

It is understood that by providing the valve cylinders F, F' and the valve cylinders G, G' with the ports as described, and rotating the inner and outer valve cylinders in opposite directions to each other, it is evident that the ports will open to their full capacity at shorter travel of the engine piston, and close much quicker that if a single rotary valve traveling in only one direction was used. By thus opening and closing the ports to their fullest capacity a uniform charge of the explosive mixture is allowed as well as a more throrough scavenging and cleaning of the engine cylinders on the exhaust stroke of the engine. It will also be noticed that by rotating the valve cylinders very little noise is produced while the engine is running.

It is understood that the valve cylinders F, F' and G, G' are positively driven from the engine shaft D and consequently the ports of the said valve cylinders always move into proper register with each other and with the corresponding ports a and b to accurately control the admission and exhaust of the explosive mixture to the several cylinders in the proper rotation and likewise control the escape of the products of combustion from the said cylinders.

In order to prevent leakage the outer valve cylinders F and G are preferably provided with suitable packing rings intermediate the staggered ports, as indicated in Fig. 3. The cylinders B, B', B² and B³ as well as the chests E and E' are preferably provided with suitable water jackets, as indicated in the drawings.

It is understood that the rotary admission and exhaust valves are so geared that they travel one complete revolution to every two revolutions of the engine shaft D and during each complete revolution of the valve cylinders F, F' and G, G' their respective ports c, d and e, f move in register with each other and with the cylinder admission and exhaust ports a and b.

Having thus described my invention, I claim as new and desire to secure by Letters Patent:

A multiple cylinder internal combustion engine provided with an admission valve and an exhaust valve, each valve comprising a pair of elongated revoluble cylinders one within the other and closed at one end, each cylinder having a longitudinal series of staggered ports of which each port of one cylinder is in the same transverse plane with a port of the other cylinder, the said cylinders having relatively engaging circular ribs and recesses at their closed ends and having shafts extending from said ends, means connected with said shafts for rotating the cylinders continuously in relatively opposite directions, a casing having a closed end and within which said cylinders are mounted, said casing and the outer cylinders having their closed ends provided with relatively engaging circular ribs and recesses, and pipes connected to the opposite casing end and against which the ends of the cylinders abut, whereby to maintain the latter in position.

In testimony whereof I have signed my name to this specification in the presence of two subscribing witnesses.

CHARLES H. BANTLEY.

Witnesses:
W. H. CALLAGHAN.
WM. J. JOLLEY.